US007011174B1

(12) United States Patent
James

(10) Patent No.: US 7,011,174 B1
(45) Date of Patent: Mar. 14, 2006

(54) MOTORCYCLE REAR SUSPENSION

(75) Inventor: Jesse G. James, Surfside, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/730,282

(22) Filed: Dec. 9, 2003

(51) Int. Cl.
*B62D 61/02* (2006.01)

(52) U.S. Cl. .................................. 180/227; 280/284

(58) Field of Classification Search ............... 180/219, 180/226, 227; 280/284
See application file for complete search history.

(56) References Cited

U.S. PATENT DOCUMENTS

| | | | | |
|---|---|---|---|---|
| 4,336,859 A | * | 6/1982 | Leitner | ..................... 180/226 |
| 4,724,920 A | | 2/1988 | Tsuchida et al. | |
| 4,744,579 A | * | 5/1988 | Roatta | ..................... 280/275 |
| 5,592,999 A | | 1/1997 | Matsuura et al. | |
| 5,749,591 A | | 5/1998 | Thurm | |
| 6,003,628 A | | 12/1999 | Jurrens et al. | |
| 6,290,017 B1 | | 9/2001 | Ito | |
| 6,357,546 B1 | | 3/2002 | Crosby, Jr. | |
| 6,668,960 B1 | * | 12/2003 | Parker | ..................... 180/227 |
| 2002/0066611 A1 | * | 6/2002 | Lane et al. | .................. 180/228 |
| 2004/0046355 A1 | * | 3/2004 | Carroll | ..................... 280/284 |

FOREIGN PATENT DOCUMENTS

EP          1378432 A2 *  1/2004

* cited by examiner

*Primary Examiner*—Tony Winner
(74) *Attorney, Agent, or Firm*—Plumsea Law Group, LLC

(57) ABSTRACT

A rear suspension system for a motorcycle is disclosed. The rear suspension system includes a lower member mechanically connected to the pivot pin and extending from the pivot pin to a rear axle assembly. The suspension system also includes an upper member connected to the lower member and an air spring assembly is disposed between the upper member and the frame. The suspension system is adjustable during operation and provides improved suspension travel.

19 Claims, 8 Drawing Sheets

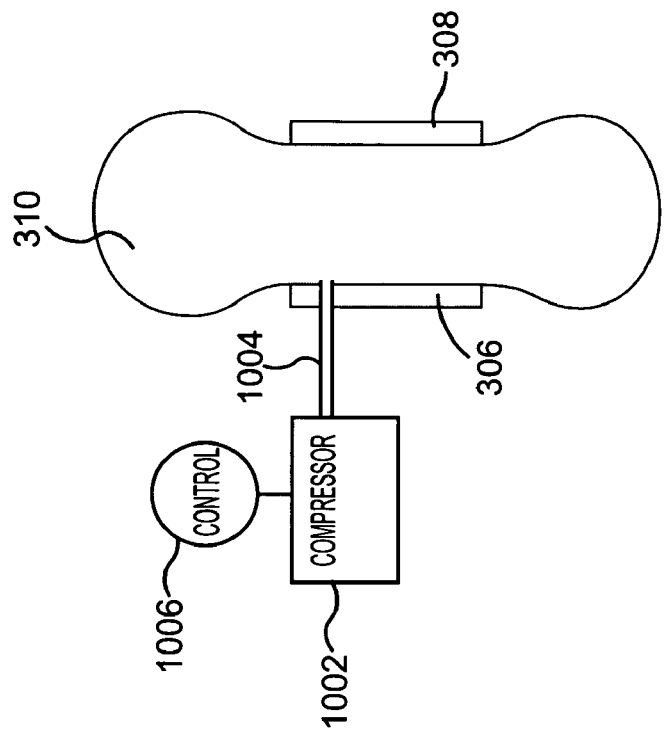
FIG.10
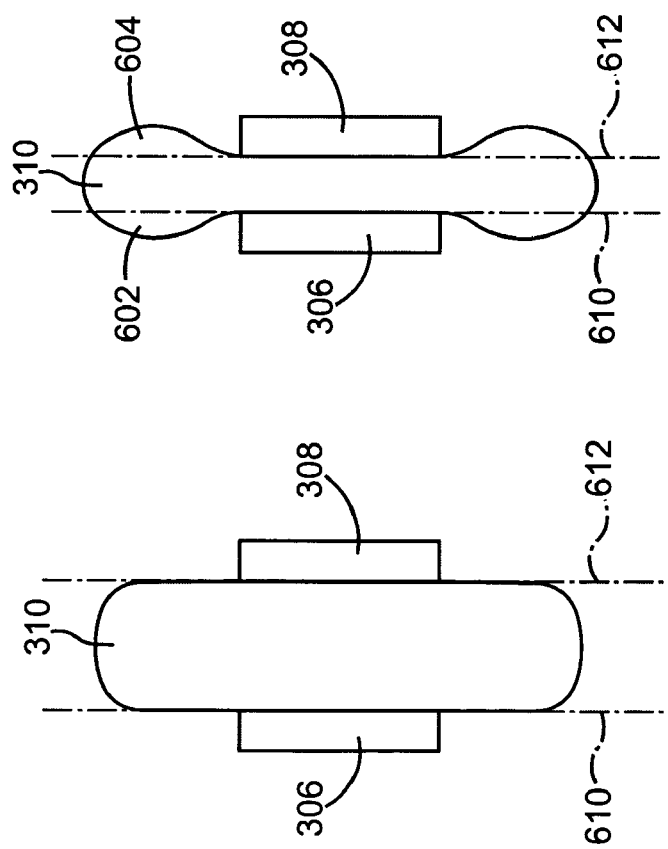
FIG.9
FIG.8

MOTORCYCLE REAR SUSPENSION

BACKGROUND OF THE INVENTION

1. Field of the Invention

The present invention relates to a motorcycle, and more particularly, to a rear suspension system for a motorcycle.

2. Background of the Invention

Motorcycle suspension systems come in a variety of different designs and configurations. Tsuchida, et al. (U.S. Pat. No. 4,724,920) discloses several prior art suspension systems that have various connection points between a frame and a rear fork. Tsuchida, et al. also proposes a rear suspension system that can raise the ground clearance of a motorcycle, that is, raise the minimum height of the motorcycle, but at the same time, reduce the center of gravity of the motorcycle.

Matsuura et al. (U.S. Pat. No. 5,592,999) discloses a height adjustable rear suspension system that uses a shock absorber link mechanism between a rear shock absorber and a swing arm. Ito (U.S. Pat. No. 6,290,017) discloses a rear suspension system that can be installed without affecting the shape and size of a fuel tank and a seat. The disadvantages of typical shock absorber-based rear suspension systems are noted by Thurm (U.S. Pat. No. 5,749,591), who discloses a rear suspension system that utilizes a leaf spring assembly. Thurm notes that the nature of a typical shock absorber-based system's suspension geometry permits very little shock absorber travel. This requires the shock absorbers to damp or absorb enormous amounts of force in very short working distances, sometimes several centimeters or less. Because of this, these systems tend to "bottom out" and usually provide a harsh ride.

Jurrens et al. (U.S. Pat. No. 6,003,628) and Crosby et al. (U.S. Pat. No. 6,357,546) disclose rear suspension systems that utilize air bags. The Jurrens air bag system does not provide enough shock absorber travel or range of motion. Another problem with the Jurrens system is the inherent complexity of the design, as noted by Crosby, Jr. Crosby's air bag system is also limited in its range of motion and can be difficult to repair or replace. The Crosby system compresses the air bag in an arc using a bag bracket. The bag bracket is a scissor-type linkage. This arrangement fails to keep the end pads of the bag in parallel relationship throughout the range of motion. Also, the Crosby system does not provide a system that can readily accept different types and sizes of air bags.

SUMMARY OF THE INVENTION

The present invention provides a rear suspension system for a motorcycle comprising a pivot pin adapted to engage a motorcycle frame, a lower member mechanically connected to the pivot pin and extending from the pivot pin to a rear axle assembly, the rear axle assembly being mechanically associated with the rear axle, an upper member connected to the lower member, the upper member being connected to an air spring assembly, and where the air spring assembly is adapted to be connected to the motorcycle frame.

In another aspect, the air spring assembly is rotatably connected to the upper member.

In another aspect, a vertical member extends between the lower member and the upper member.

In another aspect, the vertical member is attached to an inner portion of the lower member and an inner portion of the upper member.

In another aspect, a hydraulic damper disposed between the motorcycle frame and the rear suspension system.

In another aspect, the air spring assembly is attached to an upper portion of the upper member.

In another aspect, the lower member includes a hole to accommodate a drive shaft.

In another aspect, the invention provides an air spring assembly comprising a forward mounting plate, a bladder capable of deforming, a rear mounting plate, where the bladder is attached to an outer surface of the forward mounting plate and an outer surface of the rear mounting plate, and where the forward mounting plate is adapted to be attached to a motorcycle frame and where the rear mounting plate is adapted to be attached to a motorcycle rear suspension.

In another aspect, the bladder is mounted to the forward plate using a hose clamp.

In another aspect, the bladder is made of an elastomeric material.

In another aspect, the bladder is filled with a gas.

In another aspect, the bladder is filled with air.

In another aspect, the invention provides a motorcycle comprising a frame, an engine attached to the frame and a rear suspension. The rear suspension includes a lower arm and an upper arm. An air spring system disposed between the frame and the upper arm, where the air spring system includes an air bladder, the air bladder having a forward bulge portion disposed forward of a front plate.

In another aspect, the forward bulge portion is disposed forward of a rear surface of the front plate.

In another aspect, the air bladder has a rearward bulge portion disposed rearward of a rear plate.

In another aspect, the rearward bulge portion is disposed rearward of a front surface of the rear plate.

In another aspect, the air spring system includes a rear plate and wherein the rear plate can pivot with respect to the rear suspension.

In another aspect, the forward bulge is formed during compression and no forward bulge exists when the air bladder is uncompressed.

In another aspect, the air spring system includes a rear plate, and the front plate has a different horizontal position than the rear plate.

In another aspect, the air spring system includes a rear plate and the rear plate has a first horizontal distance from the front plate in an uncompressed condition and the rear plate as a second horizontal distance from the front plate in a compressed condition; and the second distance is greater than the first distance.

In another aspect, the air spring system includes a rear plate and the front plate and the rear plate remain substantially parallel throughout a range of motion of air spring system.

Other configurations, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings:

FIG. 8 is a schematic diagram of an alternative embodiment of an air spring system in an uncompressed condition;

FIG. 9 is a schematic diagram of an alternative embodiment of an air spring system in a compressed condition;

FIG. 10 is a schematic diagram of a preferred embodiment of an air spring system.

DETAILED DESCRIPTION

Figure 1:
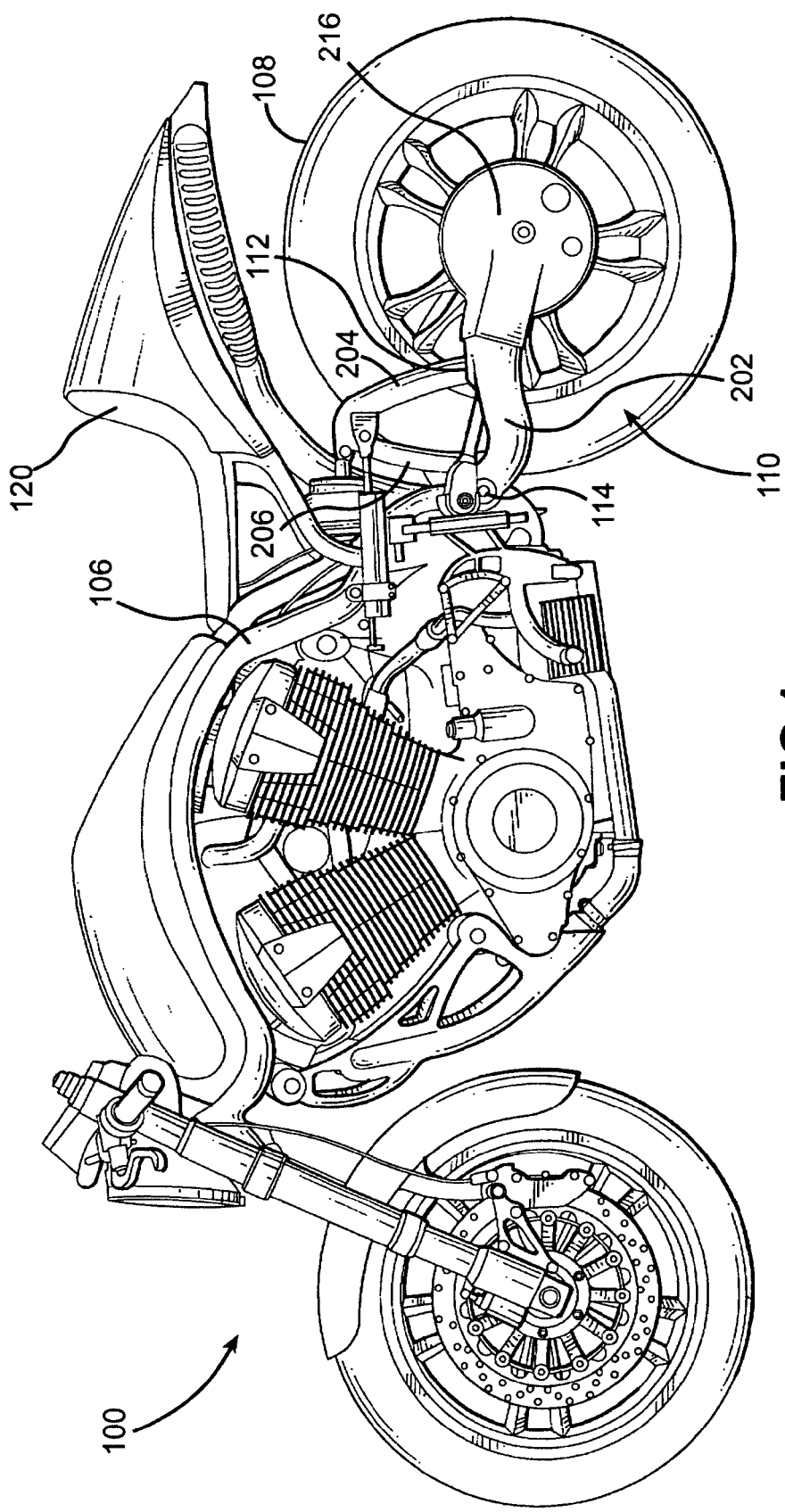
FIG. 1 is a side elevational view of a preferred embodiment of a motorcycle in accordance with the present invention.

FIG. 1 is a side elevational view of a preferred embodiment of a motorcycle 100 in accordance with the present invention. Motorcycle 100 includes a left side shown in FIG. 1, and an opposite right side. Motorcycle 100 includes frame 106, rear wheel 108 and rear suspension system 110. Rear wheel 108 is associated to frame 106 through rear suspension system 110.

Figure 2:
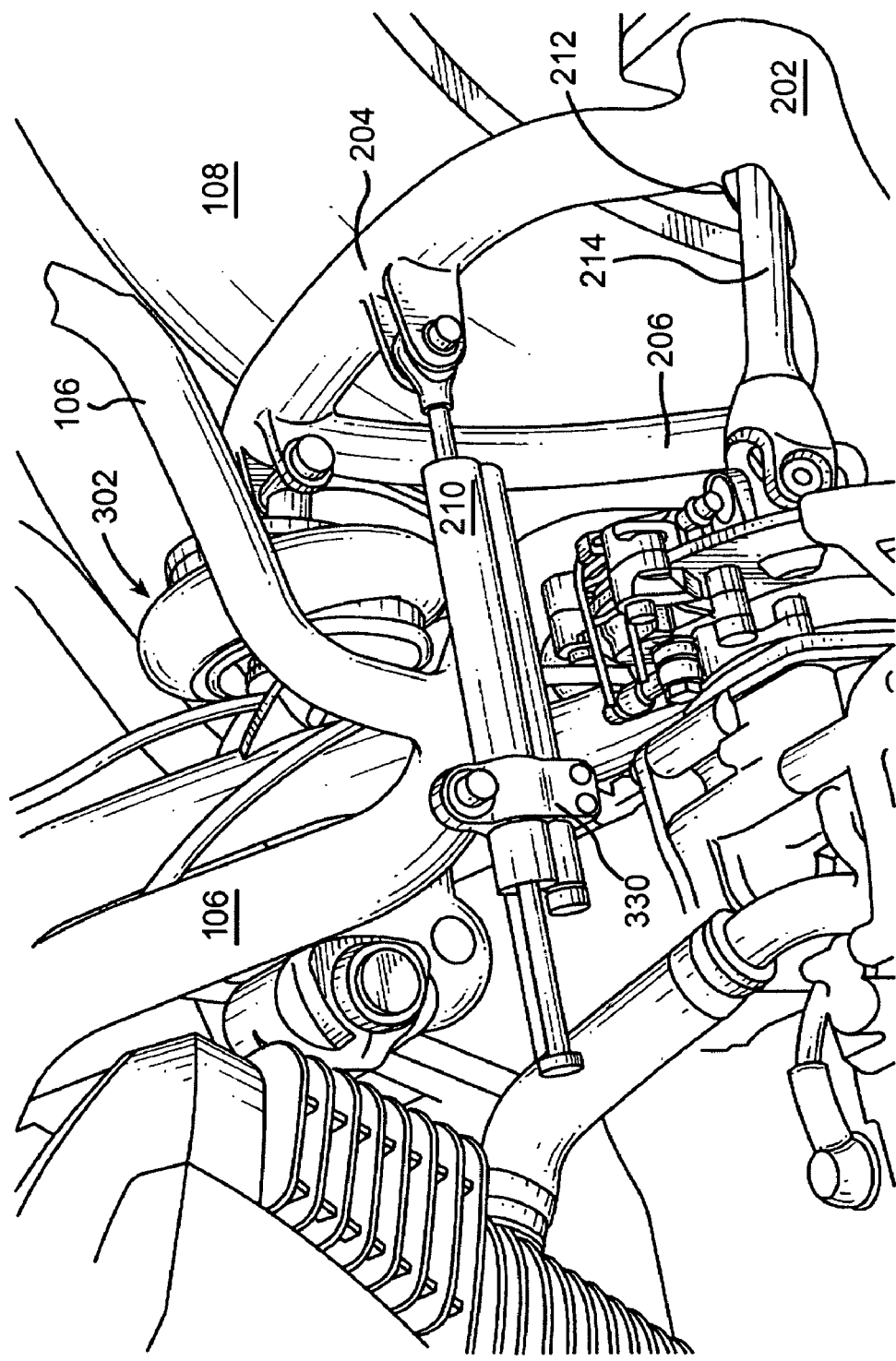
FIG. 2 is an enlarged perspective view of the rear suspension system of the motorcycle shown in FIG. 1.

Referring to FIG. 1 and FIG. 2, which is an enlarged perspective view of rear suspension system 110, rear suspension system 110 includes a swing arm assembly 112 and a pivot pin 114. Pivot pin 114 permits swing arm assembly 112 to pivot relative to frame 106. Swing arm assembly 112 includes a lower member 202, an upper member 204, and a vertical member 206. Lower member 202 extends from pivot pin 114 to a rear assembly 216 that is mechanically connected to a rear axle (not shown).

Upper member 204 is connected to lower member 202 at a region between pivot pin 114 and rear assembly 216. Upper member 204 extends upwards from lower member 202 and has a generally U-shaped configuration. Upper member 204 extends upwards from the left side of lower member 202, over rear wheel 108 and back downwards to the right side of lower member 202.

Figure 3:
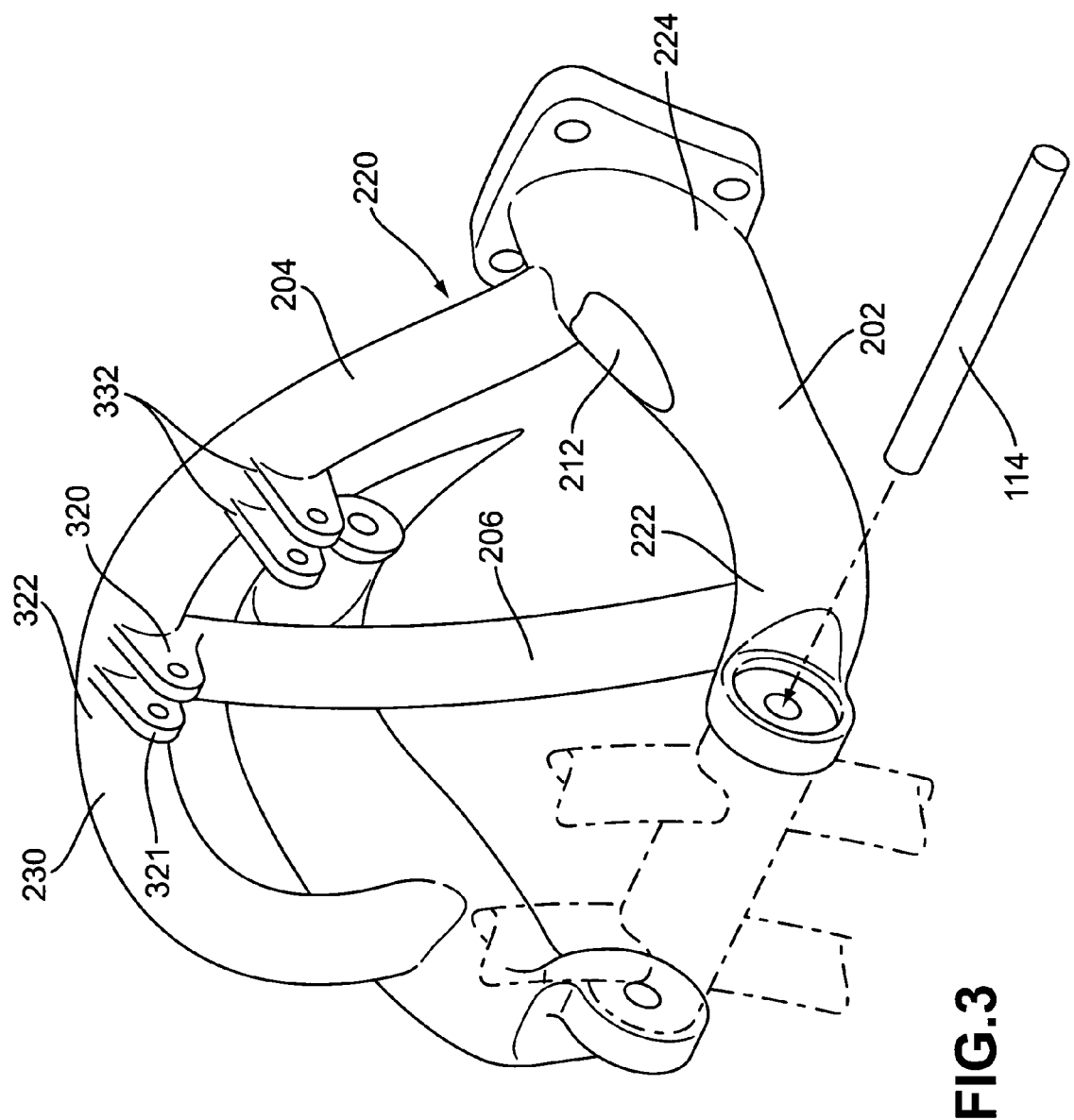
FIG. 3 is a perspective view of a preferred embodiment of a swing arm assembly in accordance with the present invention.

As also shown in FIG. 3, lower member 202 also has a generally U-shaped configuration where the open portion 220 of the U extends around a portion of rear wheel 108 and the closed portion 222 is disposed inward of the open portion. In other words, the closed portion 222 of lower member 202 is disposed closer to frame 106 than the open portion 220 of lower member 202. Lower member 202 can also include a hole 212 that is designed to accept drive shaft 214. This arrangement allows a rearward portion of drive shaft 214 to be housed inside a rearward portion 224 of lower member 202.

Rear suspension system 110 can also include one or more vertical members. First vertical member 206 is connected to closed portion 222 of lower member 202 and to inner portion 230 of upper member 204. Similarly, a second vertical member (not shown) can be connected to closed portion 222 of lower member 202 and to inner portion 230 of upper member 204. Preferably, vertical member 206 is connected to the closed inner portion of lower member 202 and the closed inner portion of upper member 204. Vertical member 206 provides increased strength to suspension system 110 and rigidly secures upper member 204 to lower member 202.

Figure 4:
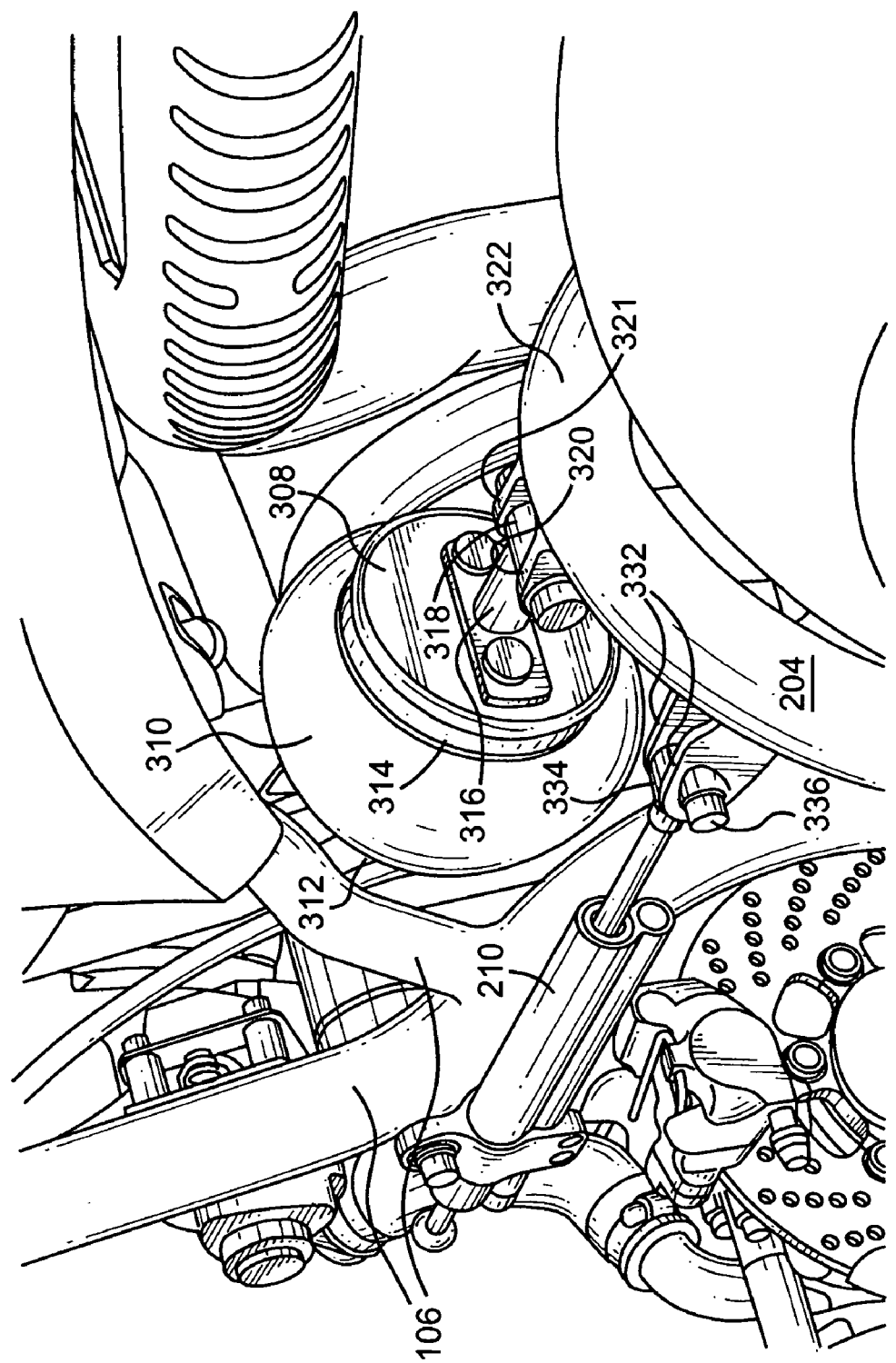
FIG. 4 is an enlarged rear perspective view of the rear suspension system of FIG. 2.
Figure 5:
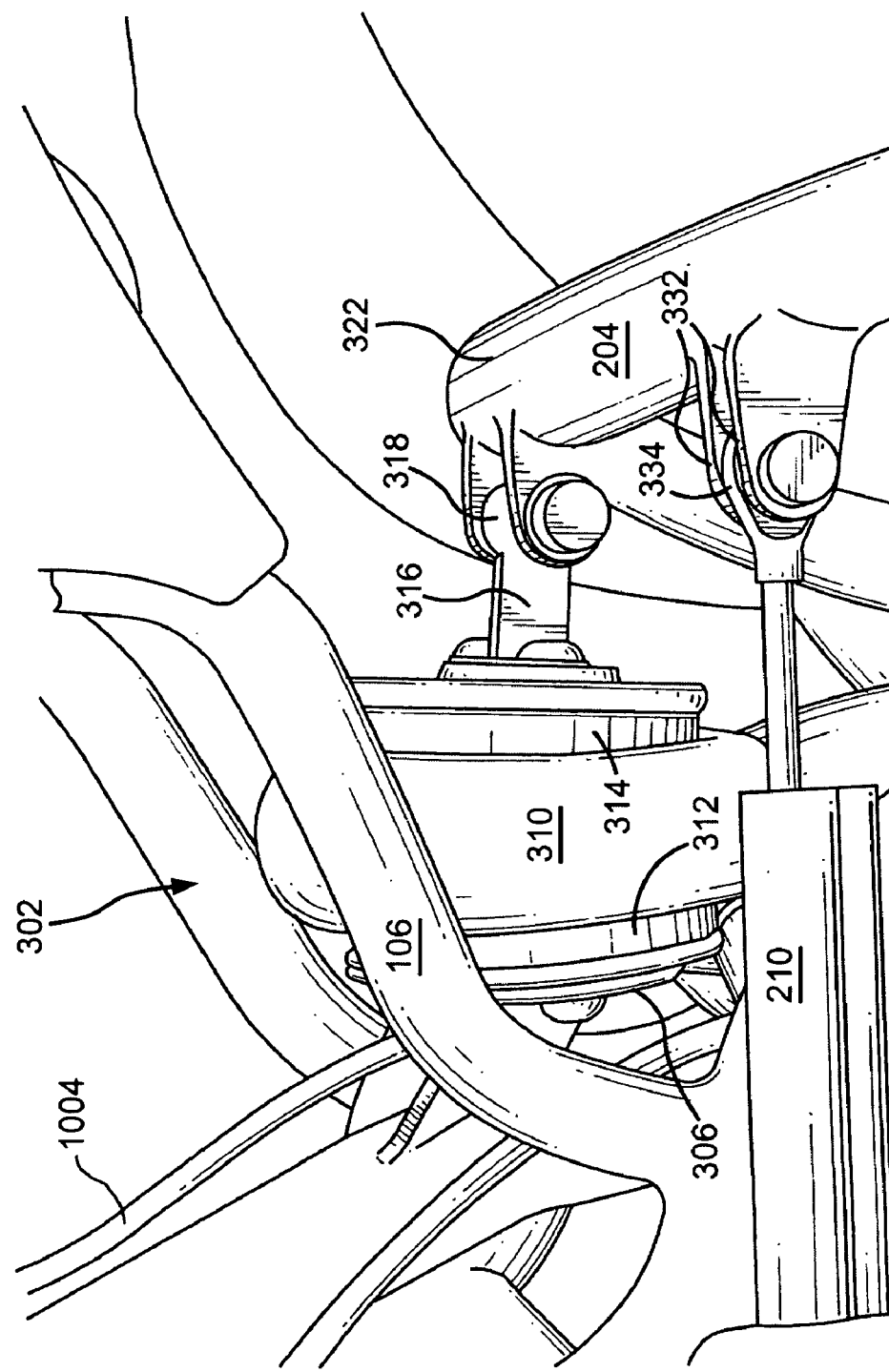
FIG. 5 is an enlarged side view of the rear suspension system of FIG. 2.

The upper portion of suspension system 110 is shown in FIG. 4, which is a rear perspective view, and in FIG. 5, which is a side view. Referring to FIGS. 4 and 5, an air spring assembly 302 connects frame 106 with upper member 204. Air spring assembly 302 includes forward mounting plate 306, rear mounting plate 308 and a bladder 310, which is mounted to the two mounting plates. In the embodiment shown in the Figures, a forward hose clamp 312 is used to attach forward side 402 of bladder 310 to forward plate 306 and a rear hose clamp 314 are used attach rear side 404 of bladder 310 to rear plate 308. Although hose clamps are used in the illustrated embodiment, other devices, joints or provisions can be used to attach bladder 310 to forward plate 306 and rear plate 308.

Forward mounting plate 306 is secured to frame 106 and rear mounting plate 308 is attached to an upper portion of upper member 204 using a bar 316 and yoke 318. Yoke 318 is disposed between a first pair of mounting flanges 320 and 321. Preferably, mounting flanges 320 are proximate an upper apex 322 of upper member 204. Yoke 318 permits the mounting flanges 320 and 321 to pivot or rotate with respect to bar 316 and rear plate 308.

Figure 11:
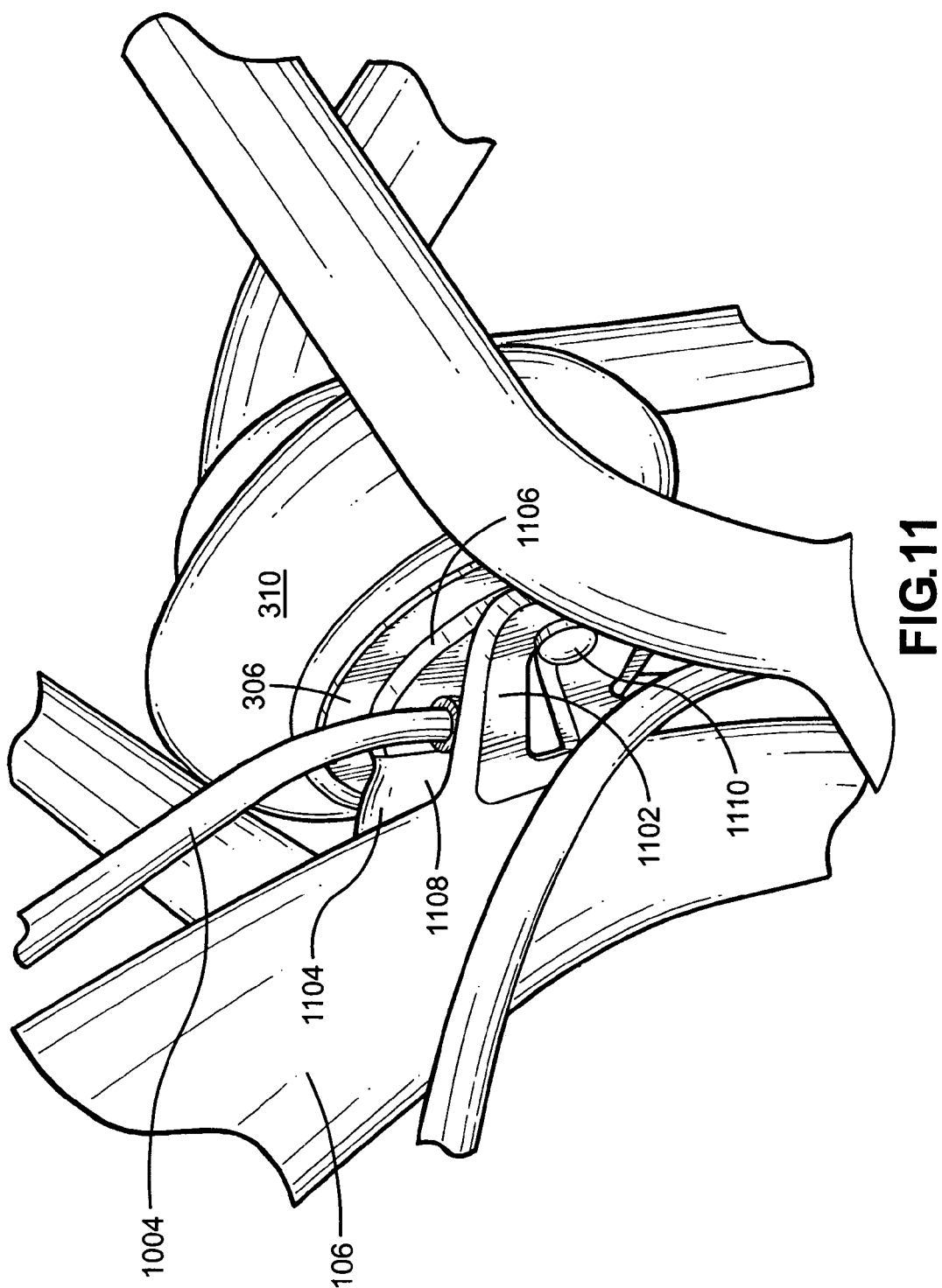
FIG. 11, is a perspective view of a preferred embodiment of an attachment assembly for an air spring system.

Front plate 306 is preferably associated with frame 106. Any suitable method can be used to attach front plate 306 to frame 106. FIG. 11, which is a perspective view of a preferred embodiment of an attachment assembly for front plate 306, shows one possible method of attaching front plate 306 to frame 106. Referring to FIG. 11, frame 106 includes first and second mounting fins 1102 and 1104, respectively. First and second mounting fins 1102 and 1104 extend toward front plate 306 and are attached to front plate mounting boss 1106. Preferably, first and second mounting fins 1102 and 1104 are spaced from one another, and form a cavity 1108 between the two mounting fins. Preferably, cavity 1108 is used to accommodate fluid line 1004. Front plate mounting boss 1106 can also include provisions, like a hole or aperture, to assist in placing fluid line 1004 in fluid communication with air bladder 310. Front plate mounting boss 1106 is designed to engage front plate 306. Any suitable arrangement can be used to associate front plate mounting boss 1106 with front plate 306, however, the use of at least one a mechanical fastener 1110 is preferred. In the embodiment shown in FIG. 11, two mechanical fasteners, one on each side (only one is visible in FIG. 11), is used.

Referring to FIGS. 1 and 4, as motorcycle 100 encounters surface irregularities like bumps, pot holes, rail road tracks, road joints and broken pavement, to name a few, while moving, rear wheel 108 translates or moves with respect to frame 106 in response to those surface irregularities. The suspension geometry of motorcycle 100 is configured so that swing arm assembly 112 pivots or rotates about pivot pin 114 in a generally circular arc with respect to frame 106. In most cases, surface irregularities cause rear wheel 108 and swing arm assembly 112 to rotate counter-clockwise (as shown in FIG. 1) with respect to frame 106. This motion, also referred to a suspension travel, can also be observed as rear wheel 108 moving generally upwards towards seat 120.

Figure 7:
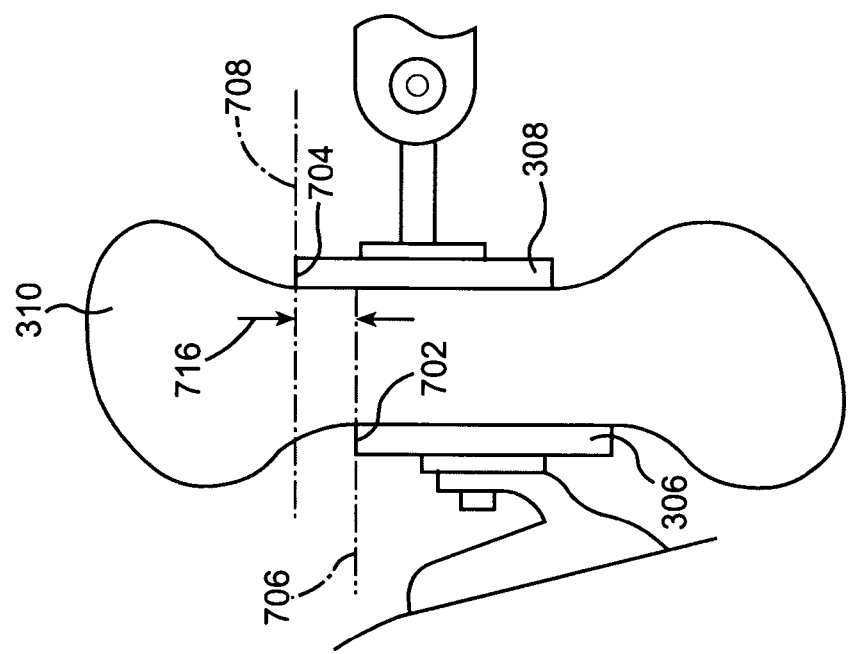
FIG. 7 is a schematic diagram of a preferred embodiment of an air spring system in a compressed condition.
Figure 6:
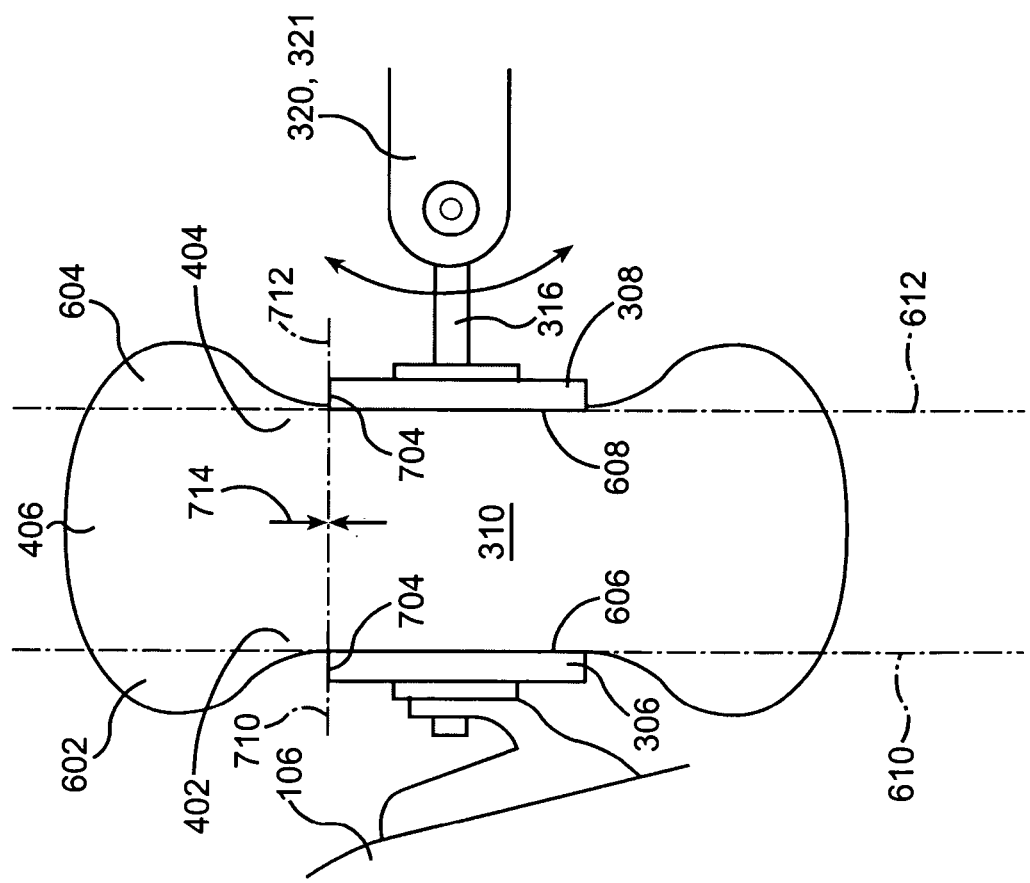
FIG. 6 is a schematic diagram of a preferred embodiment of an air spring system in an uncompressed condition.

As rear wheel 108 moves generally upwards and as swing arm assembly 112 continues to rotate counter-clockwise, upper member 204 of swing arm assembly 112 moves inwards towards frame 106. This motion affects air spring assembly 302. The motion of air spring assembly 302 in response to suspension travel can be observed in FIGS. 6 and 7, which are schematic diagrams of air spring assembly 302. FIG. 6 is a schematic diagram in an uncompressed condition and FIG. 7 is a schematic diagram in a compressed condition. As swing arm assembly 112 moves inwards towards frame 106, mounting flanges 320 and 321 move towards frame 106. In FIGS. 6 and 7, this direction of motion is generally from right to left. As mounting flanges 320 and 321 move towards frame 106, rear plate 308 moves toward front plate 306. The motion of rear plate 308 towards front plate 306 reduces the distance between the two plates and compresses or squeezes air bladder 310, as shown in FIG. 7. Generally, rear plate 308 continues to move towards front plate 306 until the internal pressure of air bladder 310 overcomes the pressure applied by rear plate 308. When this occurs, the internal pressure of air bladder 310 presses against rear plate 308 and eventually restores rear plate 308 to a rest, or equilibrium position.

Air bladder 310 is designed to allow flexibility in the design of air spring assembly 302. Air bladder 310 includes a forward bulge portion 602 and a rearward bulge portion 604. Forward bulge portion 602 is the portion of air bladder 310 that is located axially forward of a first axial plane 610 coincident with the rear face 606 of front plate 306. In other words, consider a first axial plane 610 that is defined as the axial plane of rear face 606. The forward bulge 602 is the portion of air bladder 310 that is located axially forward of this first plane 610. Similarly, rearward bulge 604 is the portion of air bladder 602 that is located axially rearward of second plane 612. Second plane 612 corresponds to the forward face 608 of rear plate 308.

These bulge portions 602 and 604 permit greater design flexibility and allow suspension tuners and designers to optimize the suspension for particular needs. For example, the size of the bulge, the thickness of air bladder 310, the internal pressure of air bladder 310, and the material properties, for example, the modulus of elasticity, of the constituent materials that make up air bladder 310 can all be adjusted to produce desired suspension response characteristics and feel.

For example, the size of the bulge can be increased to provide a softer suspension, or the size of the bulge can be decreased to provide a firmer suspension. The thickness, for example wall thickness, of air bladder 310 can be decreased to provide a softer suspension, while increasing the thickness can provide a firmer suspension. The internal pressure can be decreased to provide a softer suspension, while increasing the internal pressure can provide a firmer suspension. The material properties can be altered as well. Selecting a material with a lower modulus of elasticity tends to provide a softer suspension, while the selection of a material with a higher modulus of elasticity tends to provide a firmer suspension.

In addition, respective axial ends of air bladder 310 are secured to front plate 306 and rear plate 308. These ends have a diameter that is smaller than a central diameter of air bladder 310. As shown in the Figures, central portion 406 has a greater diameter than forward side 402 or rear side 404. This design allows the use of different sized air bladders 310 with different diameters at their central portions 406 and any of these different air bladders is able to mount on a common set of front and rear plates 306 and 308, respectively. This allows designers to select from a number of different air bladders having different sizes and/or diameters and mount any of these different air bladders on stock front and rear plates. In other words, this system permits designers to easily vary or change the size of the air bladder, as well as other factors disclosed above, to meet particular design objectives for the rear suspension. This design also allows easy replacement of old or worn air bladders 310.

FIG. 7 is a schematic diagram of air bladder 310 in a compressed condition. As shown in FIG. 7, front plate 306 includes a top portion 702; top portion 702 has a horizontal position 706 in the compressed condition. Likewise, rear plate 308 includes a top portion 704, and top portion 704 has a horizontal position 708 in the compressed condition. FIG. 6 shows the relative horizontal positions of front plate 306 and rear plate 308 in the uncompressed position. The horizontal position 710 of top portion 702 of front plate 306 can be observed in FIG. 6, as well as the horizontal position 712 of top portion 704 of rear plate 308. Recall that both of these horizontal positions 710 and 712 of the respective front 306 and rear 308 plates are in the uncompressed condition.

The horizontal positions of the top portions of the two plates can be used to characterize the relative horizontal position of the plates themselves. In the uncompressed condition, the distance between the horizontal position 710 of front plate 306 and the horizontal position 712 of rear plate 308 is 714. In the compressed condition, the distance between the relative horizontal positions of the two plates is 716. Comparing the relative horizontal positions of the two plates in the uncompressed and compressed condition, it can be observed that the compressed distance 716 is greater than the uncompressed distance 714. This means that in some embodiments, there can be change in the relative horizontal distance between the two plates, and in some embodiments, this horizontal distance between the two plates can increase in the compressed condition as compared to the uncompressed condition.

FIGS. 8 and 9 are schematic diagrams of another embodiment of the present invention. FIGS. 8 and 9 show an embodiment where a bulge portion 602 or 604 is formed in the compressed condition, but no bulge portion exists in the uncompressed condition. In some cases, it may be desirable to use an air bladder 310 that has this configuration.

FIG. 10 is a schematic diagram of air spring system 302. Air spring system 302 can include a compressor 1002 that is in fluid communication with air bladder 310 via fluid line 1004. Fluid line 1004 is shown schematically in FIG. 10, and a preferred embodiment of fluid line 1004 is shown in FIGS. 5 and 11. Compressor 1002 is configured to provide fluid to air bladder 310. Preferably, control 1006 is used to operate compressor 1002. In some cases, control 1006 maintains a desired pressure in air bladder 310 and in other cases, control 1006 can be used to adjust the pressure of air bladder 310. In some embodiments, control 1006 includes a display that can provide pressure and status information.

In some embodiments, as best seen in FIGS. 2 and 4, rear suspension system 110 includes hydraulic damper 210. Hydraulic damper 210 is mounted to frame 106. Preferably a mounting bracket 330 is used. Similar to air spring assembly 302, hydraulic damper 210 is also rotatably mounted to upper member 204. Preferably, a mounting button 334 is disposed between a second set of mounting flanges 332 extending from an upper portion of upper member 204. A wrist pin 336 is used to rotatably attach mounting button 334 to mounting flanges 332. Hydraulic damper 210 is used to provide vibration damping to the rear suspension. Hydraulic damper 210 can also assist in locating or positioning the rear suspension and can provide some lateral and torsional support to swing arm assembly 112 (see FIG. 1).

Given the above described arrangement, air spring assembly 302 replaces a conventional coil spring and allows rear suspension system 110 to move or pivot with respect to frame 106. As disclosed above, air spring assembly 302 includes a deformable bladder 310. Preferably, deformable bladder 310 is filled with a gas, in some cases air. In other embodiments, bladder 310 is filled with a liquid. As the rear suspension travels, deformable bladder 310 is squeezed between forward mounting plate 306 and rear mounting plate 308. In other words, the forward and rear mounting plates decrease and increase their distance to one another in response to suspension travel. This deformation by bladder of air spring assembly 302 helps to absorbs vibration and helps the rear wheel 108 of motorcycle 100 to maintain effective contact with the ground.

The suspension system can include many other mechanical springs, air springs, struts, dampers, shock absorbers and other suspension components.

While various embodiments of the invention have been described, it will be apparent to those of ordinary skill in the art that may more embodiments and implementations are possible that are within the scope of the invention.

What is claimed is:

1. A rear suspension system for a motorcycle comprising:
a pivot pin adapted to engage a motorcycle frame;
a lower member mechanically connected to the pivot pin and extending from the pivot pin to a rear axle assembly, the rear axle assembly being mechanically associated with the rear axle;
an upper member connected to the lower member and extending upwards from the lower member and over a rear wheel of the motorcycle, the upper member being connected to an air spring assembly by a pivoting connection; and
wherein the air spring assembly is adapted to be connected to the motorcycle frame.

2. The rear suspension system of claim 1, wherein a plate of the air spring assembly is rotatably connected to the upper member.

3. The rear suspension system of claim 1, wherein a vertical member extends between the lower member and the upper member.

4. The rear suspension system of claim 3, wherein the vertical member is attached to an inner portion of the lower member and an inner portion of the upper member.

5. The rear suspension system of claim 1, further comprising a hydraulic damper disposed between the motorcycle frame and the rear suspension system.

6. The rear suspension system of claim 1, wherein the air spring assembly is attached to an upper portion of the upper member.

7. The rear suspension system of claim 1, wherein the lower member includes a hole to accommodate a drive shaft.

8. The rear suspension system of claim 1, wherein the pivoting connection is a yoke.

9. The rear suspension system of claim 8, wherein the yoke is connected to a flange disposed on the upper member, and wherein the yoke pivots with respect to the flange.

10. A rear suspension system for a motorcycle comprising:
a swing arm assembly configured for attachment to a motorcycle frame;
the swing arm assembly including a pivot pin configured to cooperate with the motorcycle frame and an air bag assembly disposed above the pivot pin;
the air bag assembly including a forward mounting plate configured for attachment to the motorcycle frame, and a rear mounting plate attached to an upper portion of the swing arm assembly;
a bladder capable of deforming disposed between the forward mounting plate and the rear mounting plate;
wherein the bladder is attached to an outer radial surface of the forward mounting plate and an outer radial surface of the rear mounting plate.

11. The rear suspension system of claim 10, wherein the bladder is mounted to the forward plate using a hose clamp.

12. The air spring assembly of claim 10, wherein the bladder is made of an elastomeric material.

13. A rear suspension system for a motorcycle comprising:
a lower arm and an upper arm;
an air spring system disposed between a motorcycle frame and the upper arm;
the air spring system including an air bladder disposed between a front plate and a rear plate; and
wherein the air bladder having a forward bulge portion disposed forward of the front plate.

14. The rear suspension system according to claim 13, wherein the forward bulge portion is disposed forward of a rear surface of the front plate.

15. The rear suspension system according to claim 13, wherein the air bladder has a rearward bulge portion disposed rearward of the rear plate.

16. The rear suspension system according to claim 13, wherein the rearward bulge portion is disposed rearward of a front surface of the rear plate.

17. The rear suspension system according to claim 13, wherein the rear plate can pivot with respect to the rear suspension.

18. A rear suspension system for a motorcycle comprising:
an air spring system disposed between a motorcycle frame and a swing arm assembly;
the air spring system including an air bladder disposed between a front plate and a rear plate; and
wherein the front plate is misaligned with the rear plate when the air bladder is in a compressed condition.

19. The rear suspension system according to claim 18, wherein the rear plate has a first horizontal distance from the front plate in an uncompressed condition and the rear plate has a second horizontal distance from the front plate in a compressed condition; and wherein the second distance is greater than the first distance.

* * * * *